May 20, 1941.  O. SIEBLER  2,242,269
AUTOMOBILE
Filed June 27, 1938
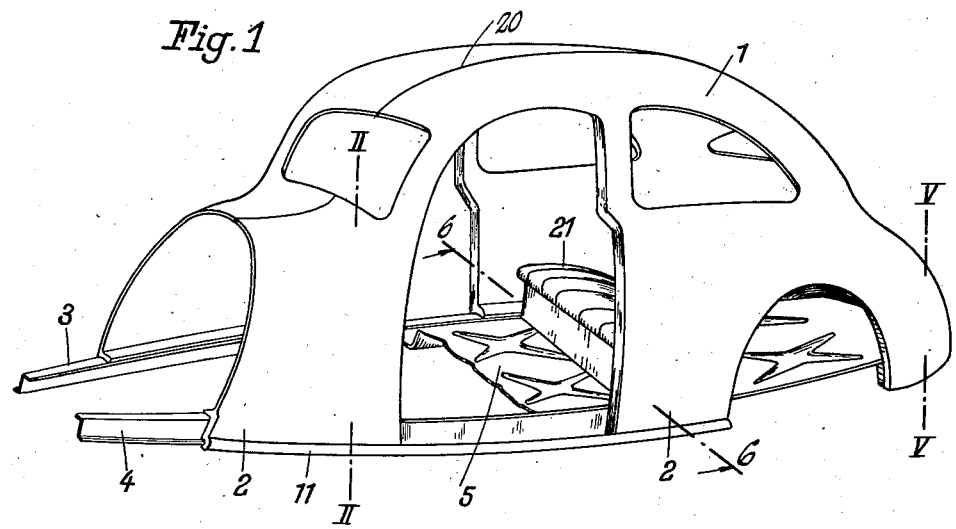
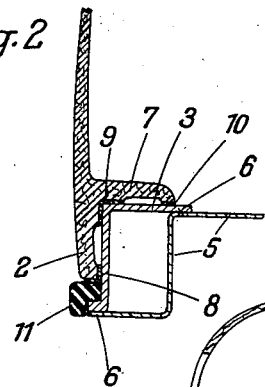
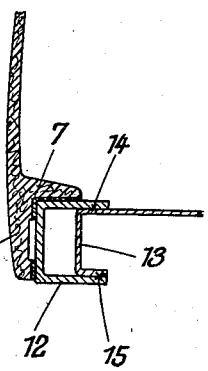
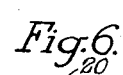
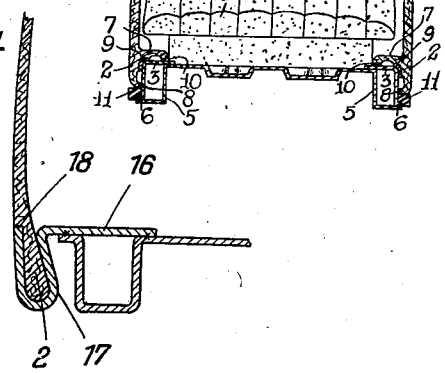
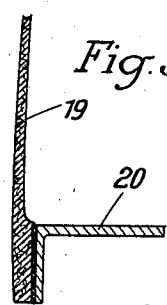
Inventor:
OSKAR SIEBLER
By:
Richards & Geier
Attorneys.

Patented May 20, 1941

2,242,269

UNITED STATES PATENT OFFICE 2,242,269

AUTOMOBILE

Oskar Siebler, Chemnitz, Germany

Application June 27, 1938, Serial No. 216,041
In Germany June 28, 1937

5 Claims. (Cl. 296—35)

This invention relates to automobiles, and has particular reference to the manner of connecting the automobile body to the frame or chassis in cases where the body is of a material of synthetic resinous character, for example, a pressing of materials, such as irregularly distributed or laminated fibrous material, saturated in a synthetic resin with the synthetic resin acting as a binding agent under the action of heat and pressure. Such like materials will hereinafter be generally referred to as "synthetic resin saturated material."

In assembling automobile bodies of synthetic resin saturated material with the chassis, a difficulty is at present being experienced in securing the walls of the body to the frame or floor of the automobile, because this is at present usually effected by bolting or riveting which necessitates reinforced or larger sections at places where the bolts or rivets pass through to obviate the danger of the bolts or rivets pulling through. Not only are the resulting awkward sections more difficult to press than plain sections without reinforcements, but also the pressing process is rendered more expensive, as the parts which are reinforced or of larger section require a much longer time to harden thoroughly than the other parts of the body. This is perhaps the primary disadvantage of such a manner of connecting the body to the chassis.

The primary object of the present invention is to overcome the above disadvantages by providing a novel means of securing an automobile body of synthetic resin saturated material to the frame, incorporating a direct and positive connection which is continuous throughout the length of contact between the body and the frame, as distinct from the intermittent connection afforded by bolts and rivets which in the present invention are dispensed with, as also are reinforcements of the synthetic resin parts by which the body is secured to the frame.

A further object of the invention is to provide means for securing a body of synthetic resin saturated material to the frame which will ensure a rigid and safe connection capable of reliably transmitting to the frame the forces set out in the body.

Another object of the invention is to provide means for securing a body of synthetic resin saturated material to the frame which will enable a light body structure of comparatively small thickness throughout except perhaps for reinforcements surrounding the door or window apertures (hereinafter referred to as a thin walled body structure) and in particular a thin walled unit pressing of laminated synthetic resin saturated material open at the bottom to be used. For this purpose we prefer to construct the frame in such a manner that it will be torsion resisting such as by providing for the frame to form a box section in conjunction with bracing transverse members in particular a transverse floor member, in such a manner that the frame or the bracing members are capable of directly receiving the load, for example, by the seats being directly mounted on the transverse floor member. It will be appreciated that in this manner any stresses due to forces transmitted from the road are prevented from having a detrimental effect on the automobile body and the latter is relieved of the high localised stresses to which it might otherwise be subjected and which would necessitate complicated shaping of the thin walled body structure at the zones subjected to heavy stresses. The light and thin walled construction of the body structure makes it possible for the latter to be formed as a unit pressing, the commercial advantage of which will be obvious.

A still further object of the invention is to effect the aforesaid continuous and positive connection by employing synthetic resin adhesive means for securing a body of synthetic resin saturated material to the frame. This has the advantage of being in the general line of the process of manufacture of the automobile body. In this case the automobile body is preferably formed with large faces for contact with the frame so as to provide a large area to enable a connection of adequate strength to be obtained, and additional enlarged contact faces may be provided on flanges whereby it is possible to apply the synthetic resin adhesive along a plurality of parallel longitudinal bands of adhesion disposed in different planes. This connection may be likened to a welded or brazed connection and alternatively the mechanical equivalent thereof may be used to effect the aforesaid positive and continuous connection, namely, mechanical clamping means comprising more particularly a U section channel on the frame narrowing towards the opening of the U, the bottom edges of the body structure being correspondingly shaped to enter therein and be clampedly embraced thereby thus enabling the use of adhesive entirely to be dispensed with the attendant advantage being that no greatly enlarged contact faces or flanges need be provided on the body structure, the bottom edges being substantially plain and only enlarged sufficiently to positively engage the said U section channel.

It is a further and general object of the present invention to provide a durable connection between the automobile body and the frame which will be simple and inexpensive to effect particularly in mass production which will be considerably expedited thereby.

The above and other objects and features of the invention including various novel combinations and desirable specific constructions will be apparent from the following description of a few illustrative embodiments given by way of example and shown in the accompanying drawing.

In the drawing in which the same reference characters designate corresponding parts throughout the several figures:

Fig. 1 is a perspective elevation of an automobile body and frame secured together;

Fig. 2 is a sectional elevation of the lower part of the assembly on the line II—II of Fig. 1;

Fig. 3 is a sectional elevation similar to Fig. 2 of a modified form of connection of the automobile body frame;

Fig. 4 is a sectional elevation similar to Fig. 2 of a further modified form of connection;

Fig. 5 is a sectional elevation of part of the bottom rear part of the automobile on the line V—V of Fig. 1; and Fig. 6 is a transverse section through an automobile body and frame.

Referring first to Fig. 1, the reference numeral I designates an automobile body constituted by a unit pressing of synthetic resin saturated material which is open at the bottom and has its bottom edges 2 mounted on longitudinal frame members 3 and 4 constituting, in conjunction with a pressed sheet metal plate 5 bracing the two longitudinal frame members and with the customary transverse reinforcements (not shown), the frame or chassis of the automobile. As shown in Fig. 2 the sheet metal plate 5 is shaped and assembled with the longitudinal frame member 3 to form a box section which in conjunction with the usual transverse reinforcements gives the frame good resistance to torsion. It will be appreciated that while in Fig. 2 only one longitudinal frame member is shown the construction is identical on the other side with the longitudinal frame member 4. In the form shown in Figs. 1 and 2 the longitudinal frame members are both of Z-section and the plate 5 is riveted or welded thereto at the places 6.

The synthetic resin saturated material of which the automobile body is pressed in one piece is expediently of such strength as to provide a resistance to bending forces, due in particular to localised impacts, of between 20 and 30 centimetre kilograms per square centimetre. These values are best obtained by laminated synthetic resin saturated material. Such laminations are preferably produced by saturating fibrous materials arranged to extend continuously throughout the work piece to be pressed, of paper or fabric strips, with synthetic resins, in particular condensation products of phenols or aromatic amines with formaldehyde, and superimposing them to form several layers. Where the automobile body is to be formed in one piece as a unit pressing such as in the form shown in Fig. 1, the laminations are with advantage formed by strips of fibrous material or paper or fabric which is puckered after the manner of crêpe paper. The laminated material so prepared is then pressed in steel tools in a manner known per se, the requisite amount of heat being applied, and the puckering enables the strips forming the laminations to yield a little and to adjust themselves relatively to one another in the pressing process, especially at points where sharp corners are formed, such as along the line where the scuttle or the flanges, to which reference will yet be made, join the rest of the body.

The finished automobile body is then positioned on the frame with the bottom edges of the body mounted in contact therewith. The connection of the bottom edges to the frame is effected by adhesive for which preferably a synthetic resin adhesive is used. The synthetic resin adhesive may be either liquid or viscous like ordinary glue, or alternatively powdered synthetic resin may be applied at the places where the frame is to be connected to the body, the body being then mounted in position on the frame and the places where the adhesive is applied are subjected to heat and considerable pressure causing the powdered synthetic resin to fuse and unite with the synthetic resin body and the frame, thereby rigidly connecting them together.

In order to obtain a strong connection between the body and the longitudinal frame members 3 and 4, the bottom edges 2 of the automobile body so far as they are in contact with the longitudinal frame members have a flange 7 formed thereon in the pressing operation for which purpose the pressing tools must of course be specially shaped and in several parts. The flange 7 serves to give a larger area of contact with the frame members, the adhesive being applied in several bands 8, 9 and 10 (indicated by solid black lines) along which the bottom edge 2 and the flange 7 is provided with ribs as can be seen from Fig. 2. The bands of adhesion thus lie in different planes, whereby great strength of the connection is achieved.

As will be seen from Fig. 1 the plate 5 extends rearwardly beyond the longitudinal frame members 3 and 4 and the rear bottom edges of the car body are therefore secured, not to the longitudinal frame members, but to the extension of the plate 5. This is shown in Fig. 5 of the drawing. The extension of the plate 5 constitutes a floor member 20 which directly adjoins the plate 5 and may be either secured thereto or formed in one therewith. In this construction of the automobile, the frame, of which the transverse floor member 20 and the plate 5 form part, serves to take the load directly. Thus, for example, the rear seat 21 is mounted directly on the plate 5, which thus also serves as a floor member, as shown in Fig. 1. The rear portion of the body has its bottom edge 19 adhesively secured to a downwardly extending flange on the transverse floor member 20, and in this case there is no need to provide a flange on the bottom edge of the body, the adhesive being applied in a single band, as shown in Fig. 5. It will be appreciated, however, that the bands of adhesion both between the bottom edges and the longitudinal frame members (Fig. 2) and the rear bottom edges and the floor member 20 (Fig. 5) extend continuously throughout the length of contact between the bottom edges and these members respectively.

In the form of connection of the bottom edges 2 to the longitudinal frame members 3 and 4 shown in Figs. 1 and 2, the bottom edge 2 of the automobile body is protected by a bead 11 mounted on the longitudinal frame members below the bottom edge of the automobile body, preferably by being glued to the longitudinal frame members and extending continuously on the frame members including that part of the frame members where the door apertures are provided, substantially as shown in Fig. 1. The bead 11 protrudes slightly over the face of the side of the automobile body and consists either of rubber or of some elastic synthetic material.

A modified form of connecting the bottom edges 2 of the automobile body to the longitudinal frame members is shown in Fig. 3, the connection of the rear portion of the body to the frame in this construction may be the same as in Figs. 1 and 5. In this construction the bottom edge of the automobile body is of substantially the same form as in Fig. 2 subject to slight variations which will be seen from the drawing. The longitudinal frame members, of which in Fig. 3 only one is shown and denoted by the reference 12, is however constructed as a channel section opening inwardly. The plate 5 in this case is provided with channel-section flanges 13 which are mounted on the longitudinal frame members in the manner shown in Fig. 3 and riveted or welded thereto at the places 14 and 15. Synthetic resin adhesive is applied as before in several bands between the members 2, 7 and 12 as shown by the solid black lines, again extending throughout the length of contact between these members.

Another modification of the connection between the bottom edges of the automobile body and the longitudinal frame members is shown in Fig. 4. In this construction the bottom edges are left substantially plain without any flanges or the like. The positive and direct connection continuously throughout the length of contact is effected by the mechanical equivalent of the adhesive securing means described in the previous embodiments, namely by mechanical clamping means. For this purpose, a member 16 which forms part of each of the longitudinal frame members is bent to form a loop or channel 17 of U-section, as shown, in which the bottom edge 2 of the automobile body is mounted. The U-section channel 17 narrows towards the opening of the U and the bottom edge 2 is correspondingly formed with a rounded enlargement fitting snugly in the channel or loop 17 and is firmly embraced and gripped thereby with a clamping action. The body has a shoulder 18 formed in it in the pressing operation, against which the end of the channel 18 abuts, the outer face of the channel thus lying flush with the outer side face of the automobile body. The U-section loop or channel 17 will provide a welcome reinforcement of the frame part 16. No adhesive need be used in this form of connection, as the longitudinal frame members may be made to extend rearwardly throughout the length of the body, the connection of the rear portion of the body to the frame members being substantially the same as that described above with reference to Fig. 4. The longitudinal frame members in this case are constituted by the frame member 16 secured to a channel section member integral with a transverse bracing member to form a torsion-resisting box section in conjunction therewith, as indicated in Fig. 4. Alternatively, a transverse member at the rear of the frame may be formed in like manner as the member 16 in Fig. 4 to engage the bottom edge 2 of the automobile body with a clamping action. In any case, the arrangement is such that the clamping means provides positive and direct connection continuously throughout the length of contact between the bottom edges of the automobile body and the frame.

It will be appreciated that, as stated in the introduction to this specification, the construction of the frame to give good resistance to torsional stresses enables a light construction of body to be employed for assembling therewith without any of the special reinforcements (except perhaps those surrounding the door aperture and the like) usually formed in the pressing operation with this type of synthetic resin automobile body, which in turn enables the body to be formed in one piece as a unit pressing. As however for the forms of construction shown in Figs. 2 and 3 this necessitates the use of pressing tools consisting of several parts, it may be desirable, in order to effect a saving in the purchase and maintenance of the tools, to make the body in several parts. In that case it is recommended to make it in two substantially symmetrical parts 1 and 1a (Fig. 6) with the line of division 20, when the parts are assembled together, going through the longitudinal central plane of the automobile right from the front to the rear of the body. The seam formed along this line can be closed by a strip of synthetic resin material adhesively united with the two parts and rigidly connecting them together; there need thus be no change otherwise in the construction of the automobile body or its connection to the frame departing to any appreciable extent from the embodiments described in the foregoing.

Other modifications of the mode of connecting the automobile body to the frame or chassis and of the construction of the various co-acting parts which will be obvious to those skilled in the art can be made within the ambit of the appended claims and are intended to be covered thereby.

What I claim and desire to secure by Letters Patent is:

1. In an automobile having a thin-walled body structure consisting of a synthetic resin saturated material and open at the bottom to form downwardly extending bottom edge portions and a chassis-frame including longitudinal frame members and a transverse floor member bracing said longitudinal frame members and having a rear portion extending beyond said longitudinal frame members; a connecting member extending inwardly and substantially at right angles to said bottom edge portions, said connecting member being connected with said longitudinal frame members and with said bottom edge portions along its entire length; and a vertical layer of synthetic resin adhesive means carried by the rear portion of the transverse floor member and positively and directly contacting said bottom edge portions continuously throughout the entire length of those parts of the bottom edge portions which are situated opposite said rear portion of the transverse floor member.

2. In an automobile having a thin-walled body structure consisting of a synthetic resin saturated material and open at the bottom to form downwardly extending bottom edge portions and a chassis-frame including longitudinal frame members having outwardly projecting flanges; another flange integral with said bottom edge portions and extending inwardly and substantially at right angles to said bottom edge portions, a horizontal layer of synthetic resin adhesive means carried by said longitudinal frame members and positively and directly contacting said other flange continuously throughout the entire length thereof, a vertical layer of synthetic resin adhesive means carried by said longitudinal frame members and positively and directly contacting said bottom edge portions below said other flange, and an elastic protective bead extending continuously on said chassis-frame below the bottom edges of said bottom edge portions and contacting these bottom edges and the outwardly projecting flanges of the longitudinal frame members.

3. In an automobile having a thin-walled body structure consisting of a synthetic resin saturated material and open at the bottom to form downwardly extending bottom edge portions and a chassis-frame including longitudinal frame members; a connecting member having a portion connected with said longitudinal frame members and extending inwardly and substantially at right angles to said bottom edge portions, said connecting member having another portion which is U-shaped in cross-section and which forms a channel narrowing toward the opening of the U, the bottom edge of said bottom edge portions being of corresponding shape and being situated within said channel, the walls of said channel embracing said bottom edges and clamping them.

4. In an automobile, in combination with a body structure consisting of a cover-shaped pressing of laminated, synthetic resin-saturated material which is open at the bottom to form downwardly extending edge portions; an assembled chassis-frame including a transverse frame member and longitudinal frame members firmly connected with said transverse frame member and having edge portions adapted to extend adjacent to and substantially parallel to surfaces of the edge portions of said body structure; and clamping means directly engaging the edge portions of said body structure and of said chassis-frame to connect directly said chassis-frame with said body structure.

5. In an automobile having a thin-walled body member, consisting of a synthetic resin saturated material and having a wall portion and an elongated edge portion which constitutes a continuation of said wall portion and which is thicker than said wall portion, and a frame portion comprising an elongated member, which is box-shaped in cross-section, and an elongated connecting member which is connected with the first-mentioned member and which is U-shaped in cross-section, said connecting member being adapted to embrace said edge portion.

OSKAR SIEBLER